United States Patent [19]

Morrin et al.

[11] 3,938,102

[45] Feb. 10, 1976

[54] METHOD AND APPARATUS FOR ACCESSING HORIZONTAL SEQUENCES AND RECTANGULAR SUB-ARRAYS FROM AN ARRAY STORED IN A MODIFIED WORD ORGANIZED RANDOM ACCESS MEMORY SYSTEM

[75] Inventors: Thomas Harvey Morrin, San Jose; David Curtis Van Voorhis, Los Gatos, both of Calif.

[73] Assignee: International Business Machines Corporation, Armonk, N.Y.

[22] Filed: Aug. 19, 1974

[21] Appl. No.: 498,352

[52] U.S. Cl. .................. 340/172.5; 340/146.3 MA
[51] Int. Cl.[2] .......................................... G06F 15/20
[58] Field of Search ............. 178/DIG. 22, DIG. 34; 340/146.3 MA, 172.5

[56] References Cited

UNITED STATES PATENTS 3,766,520 10/1973 Patterson ................. 340/146.3 MA

*Primary Examiner*—R. Stephen Dildine, Jr.
*Attorney, Agent, or Firm*—R. Bruce Brodie

[57] ABSTRACT

A conventional word organized random access memory is modified for image processing operations so that the $pq$ image points of any $1 \times pq$ or $p \times q$ subarray of an $rp \times sq$ or smaller image array stored in the memory can be extracted or updated in a single memory cycle. The invention contemplates $pq$ memory modules labeled from 0 to $pq-1$ for storing the image points, each module being able to store $rs$ points in distinguishable cells, only one cell of which is randomly accessible in a single instant of time. The invention further contemplates accessing circuitry for causing each image point $I(i,j)$ of an image array to be routed to or from a memory module $M(i,j)$ according to the relation $M(i,j)=(iq+j)//pq$, where $(iq+j)//pq$ is the remainder resulting from the integer division of $(iq+j)$ by $pq$. The accessing circuitry additionally causes image point $I(i,j)$ to be stored into or retrieved from a cell location $A(i,j)$ of module $M(i,j)$ according to the relation $A(i,j)=(i/p)s+(j/q)$, where $i/p$ and $j/q$ represent integer quotients.

5 Claims, 10 Drawing Figures

APPARATUS FOR ACCESSING MODIFIED WORD ORGANIZED RAM

APPARATUS FOR ACCESSING MODIFIED WORD ORGANIZED RAM

| | j=0 | 4 | 8 | 12 | 16 | 20 | 24 | 28 |
|---|---|---|---|---|---|---|---|---|
| i=0 | 0 1 2 3 | 4 5 6 7 | 8 9 A B | C D E F | 0 1 2 3 | 4 5 6 7 | 8 9 A B | C D E F |
| | 4 5 6 7 | 8 9 A B | C D E F | 0 1 2 3 | 4 5 6 7 | 8 9 A B | C D E F | 0 1 2 3 |
| | 8 9 A B | C D E F | 0 1 2 3 | 4 5 6 7 | 8 9 A B | C D E F | 0 1 2 3 | 4 5 6 7 |
| | C D E F | 0 1 2 3 | 4 5 6 7 | 8 9 A B | C D E F | 0 1 2 3 | 4 5 6 7 | 8 9 A B |
| 4 | 0 1 2 3 | 4 5 6 7 | 8 9 A B | C D E F | 0 1 2 3 | 4 5 6 7 | 8 9 A B | C D E F |
| | 4 5 6 7 | 8 9 A B | C D E F | 0 1 2 3 | 4 5 6 7 | 8 9 A B | C D E F | 0 1 2 3 |
| | 8 9 A B | C D E F | 0 1 2 3 | 4 5 6 7 | 8 9 A B | C D E F | 0 1 2 3 | 4 5 6 7 |
| | C D E F | 0 1 2 3 | 4 5 6 7 | 8 9 A B | C D E F | 0 1 2 3 | 4 5 6 7 | 8 9 A B |
| 8 | 0 1 2 3 | 4 5 6 7 | 8 9 A B | C D E F | 0 1 2 3 | 4 5 6 7 | 8 9 A B | C D E F |
| | 4 5 6 7 | 8 9 A B | C D E F | 0 1 2 3 | 4 5 6 7 | 8 9 A B | C D E F | 0 1 2 3 |
| | 8 9 A B | C D E F | 0 1 2 3 | 4 5 6 7 | 8 9 A B | C D E F | 0 1 2 3 | 4 5 6 7 |
| | C D E F | 0 1 2 3 | 4 5 6 7 | 8 9 A B | C D E F | 0 1 2 3 | 4 5 6 7 | 8 9 A B |
| 12 | 0 1 2 3 | 4 5 6 7 | 8 9 A B | C D E F | 0 1 2 3 | 4 5 6 7 | 8 9 A B | C D E F |
| | 4 5 6 7 | 8 9 A B | C D E F | 0 1 2 3 | 4 5 6 7 | 8 9 A B | C D E F | 0 1 2 3 |
| | 8 9 A B | C D E F | 0 1 2 3 | 4 5 6 7 | 8 9 A B | C D E F | 0 1 2 3 | 4 5 6 7 |
| | C D E F | 0 1 2 3 | 4 5 6 7 | 8 9 A B | C D E F | 0 1 2 3 | 4 5 6 7 | 8 9 A B |

MEMORY MODULE M(i,j) ASSIGNMENT FOR I(i,j) WITHOUT CELL NUMBERS A(i,j) WHEN p = q = r = 4 AND s = 8

M ( i,j ) = ( iq + j ) // pq WHERE // = INTEGER REMAINDER
A ( i,j ) = ( i/p ) s + j/q / = INTEGER QUOTIENT

FIG. 2A

INDIVIDUAL CELL A (i,j) ASSIGNMENT FOR I (i,j) WITHOUT MODULE NUMBERS M (i,j) WHEN p = q = r = 4 AND s = 8

$$M(i,j) = (iq + j) // pq$$
$$A(i,j) = (i/p)s + j/q$$

A DETAILED OVERVIEW OF THE ADDRESS AND CONTROL CIRCUITRY

GLOBAL LOGIC

INPUTS: t,i,j

OUTPUTS: R= {t,xo,yo,zo,io} ; ℓv(k), $o \leq k < q$; M (i,j)

LOGICAL CALCULATIONS:

xo=i/p; io=i//p yo=j/q; vo=j//q $\mu$o= (io + yo)//p zo=$\bar{t}\cdot\mu$o+t (yo//p)

M (i,j)= $\mu$o·q + vo

ℓv (k) = LT(k,vo), $o \leq k < q$

ROW LOGIC

INPUTS: µ,R= {t,xo,yo,zo,io}

OUTPUTS: t;xo;yµ; ℓµ;eµ

LOGICAL CALCULATIONS:

$z=(\mu-zo)//p$ $y\mu=yo+\bar{t}\cdot z$ $e\mu 1=EQ(z,o)$ $\ell\mu=LT(z,io);e\mu 2=EQ(z,io)$ $e\mu=\bar{t}\cdot e\mu 1+t\cdot\overline{e\mu 1}\,(\ell\mu+e\mu 2)$ MODULE LOGIC COMPONENT ASSOCIATED WITH THE $k^{th}$ MEMORY MODULE INPUTS : $t, xo, y\mu; \ell\mu; e\mu; \ell v$ (k//q)

OUTPUT: $\ell(i,j,k,t)$

LOGICAL CALCULATIONS:

$$x = xo + t\,(\bar{\ell}v \cdot \ell u + \ell v \cdot e\mu)$$
$$y = y\mu + p \cdot \bar{t} \cdot eu \cdot \ell v + t \cdot iv$$
$$\ell(i,j,k,t) = x \cdot s + y$$

RIGHT ROTATE PERMUTER

INPUTS: M(i,j) ; D = {d(0),d(1),---,d(pq-1)}

OUTPUTS: E = {e(0),e(1),---,e(pq-1)}

LOGICAL CALCULATIONS:

$e(k) = d( [k-M(i,j)] //pq), 0 \leq k < pq$

RIGHT ROTATE 0/1

LEFT ROTATE PERMUTER

INPUTS: M(i,j) ; E = {e(0),e(1),---,e(pq-1)}
OUTPUTS: D = {d(0),d(1),---,d(pq-1)}
LOGICAL CALCULATIONS:
d(k) = d( [k + M(i,j)] //pq), 0 ≤ k < pq

METHOD AND APPARATUS FOR ACCESSING HORIZONTAL SEQUENCES AND RECTANGULAR SUB-ARRAYS FROM AN ARRAY STORED IN A MODIFIED WORD ORGANIZED RANDOM ACCESS MEMORY SYSTEM

BACKGROUND OF THE INVENTION

This invention relates to an access and apparatus for selectively extracting or updating subarrays of a larger array stored in a modified work organized random access memory system, and more particularly, relates to the modifications to a conventional work organized memory used for image processing.

As understood, a digital image is considered to be a two-dimensional array of image points, each of which comprises an integer or a set of integers. Image manipulation ideally subsumes the capability of storing an image array in a memory and operating upon selected clusters of points simultaneously, such as sequences of points in a single row of the array and points within a small rectangular area. This imposes the constraint that the memory must allow all points in any selected cluster to be accessed in one memory cycle. If any desired combination of points in the array could be accessed simultaneously from a bit addressable memory, then storage and retrieval of clusters of image points would pose no problem. However, because digital images form large arrays, only word organized memories are economically available. A conventional word organized memory includes a plurality of randomly accessible "words" of storage locations, each word of which can store a cluster of image points. However, it is necessary to modify the accessing mechanism of this conventional memory in order to permit access to clusters of image points when the points are not all in the same word of storage.

An image can be represented by a $M \times N$ array $I(*,*)$ of image points, where each point $I(i,j)$ for $O \leq i<M$ and $O \leq j<N$ is an integer or a set of integers which represents the color and intensity of a portion of the image. For simplicity, attention can be restricted to black/white images, for which $I(i,j)$ is a single bit of information. Typically, $I(i,j)=1$ represents a black area of the image, and $I(i,j)=0$ represents a white area.

Images are most commonly generated by scanning pictorial data such as 8 ½ inch × 14 inch documents. Thereafter, they can be stored, viewed from a display, transmitted, or printed. Since most scanners and printers process an image from top to bottom and from left to right, images are normally transmitted in the standard "row major" sequence: $I(0,0)$, $I(0,1)$, . . . , $I(0,N-1)$, $I(1,0)$, . . . , $I(M-1, N-1)$. Therefore, a memory system for image processing operations should at least permit simultaneous access to a number of adjacent image points on a single row of $I(*,*)$. This would permit the image or a partial image to be transferred rapidly into and out of the memory system, with many image points in each row being transferred simultaneously.

It is also desireable to access rectangular blocks of points within the image to accomodate another class of image processing operations, such as block insertion, block extraction, and contour following. For example, it may be desirable to add alphanumeric characters to the image from a stored dictionary, which dictionary includes a predefined bit array for each character. Similarly, it may be desirable to delete or edit characters or other rectangular blocks from an image. Lastly, algorithms for locating the contours of objects in the image involve moving a cursor from one image point to another along a border or boundary of an object. The contour following algorithms require rapid access to an image point and a plurality of its near neighbors, which together constitute a block of image points.

Typically, a word organized random acess memory comprises a plurality of memory modules, each module being a storage device with a plurality of randomly accessible storage cells. Although each cell is able to store an image point which comprise a single bit of information, only one cell in a module can be accessed (read from or stored into) at a time. The accessing mechanism of a conventional word organized random acess memory provides a single cell address to all of its constituent memory modules, so that the ith cell in one module can be accessed only in conjunction with the ith cell of all other modules. (These cells together comprise the ith word of the memory). A conventional word organized random access memory thus provides access to a cluster of image points only if they are all stored in the same word of the memory. However, a suitable modification of the accessing mechanism for a word organized memory can permit acess to any desired cluster of image points, provided each module stores at most one point in the cluster.

As stated previously, a memory system is desired which permits access to horizontal sequences and rectangular blocks of image points. Therefore, it is necessary to determine a method for distributing image points among memory modules which places the elements of horizontal sequences in distinct memory modules and which also places the elements of rectangular blocks in distinct memory modules. Relatedly, it is necessary to devise addressing circuitry which permits simultaneous access to all elements of the horizontal sequences or rectangular blocks. Lastly, it is necessary to design circuitry which arranges the elements of the sequences or blocks accessed into a convenient order, such as row major order.

SUMMARY OF THE INVENTION

It is accordingly an object of this invention to modify a conventional word organized random access memory for image processing operations so that it is capable of storing an image or partial image therein, and so that it permits access to sequences of image points along any row of the image array and to the image points within any small rectangular area of this array. Restated, it is an object to modify a conventional word organized random access memory which stores an $rp \times sq$ or smaller image array such that any $1 \times pq$ or $p \times q$ subarray of the image can be accessed (read or written) in a single memory cycle, $p$, $q$, $r$, and $s$ being design parameters.

The foregoing objects are believed satisfied by an apparatus for storing black/white images, which apparatus includes a novel accessing arrangement. The apparatus comprises memory means for storing the image points in the cells of $pq$ different memory modules, each module being an entity capable of storing $rs$ image points in distinguishable cells, only one cell of which is randomly accessible at a single instant of time. The apparatus further comprises means for extracting from the memory means either horizontal linear sequences of length $pq$ or rectangular matrices of dimension $p \times q$, the starting point in the array for either sequence or matrix being arbitrary. Relatedly, the apparatus also comprises means for arranging the elements of the sequences or blocks accessed into row major order.

Restated, the disclosed apparatus includes pq memory modules labled 0, 1, . . . , $pq-1$, which modules can together store an $rp \times sq$ image array consisting of image points $I(i,j)$, where $i$ lies on the range $O \leq i<rp$ and $j$ lies on the range $0 \leq j>sq$. Secondly, the disclosed apparatus includes routing means which causes image point $I(i,j)$ to be routed to or from memory module $M(i,j)=(iq+j)//pq$, where $(iq+j)//pq$ constitutes the remainder resulting from the integer division of the quantity $(iq+j)$ by the quantity $pq$. Thirdly, the disclosed apparatus includes address calculation means which, in conjunction with the routing means, causes image point $I(i,j)$ to be stored into or retrieved from location $A(i,j)=(i/p)s+(j/q)$ of memory module $M(i,j)$, where $(i/p)$ and $(j/q)$ represent integer quotients. Lastly, the disclosed apparatus includes control means which achieves simultaneous storage or retrieval of the $pq$ image points in any $1 \times pq$ or $p \times q$ subarry of the image array.

DESCRIPTION OF THE PREFERRED EMBODIMENT

Figure 1:
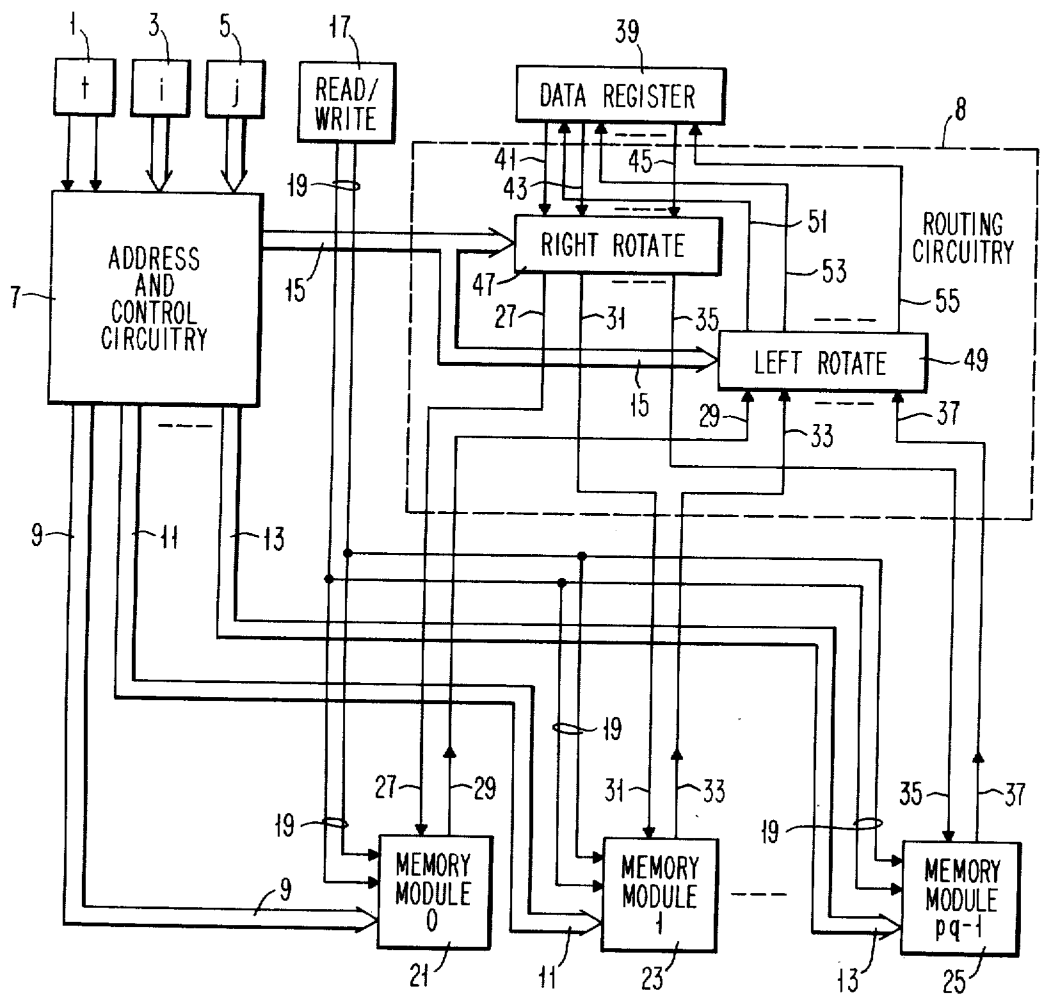
FIG. 1 shows the architecture of a word organized memory modified according to the invention.

Referring now to FIG. 1, there is shown the architecture for the modified word organized random access memory system. The apparatus includes pq memory modules 21, 23, and 25. Each module is able to store rs image points, which comprise rs bits of information. Address and control circuitry 7 permits these modules to store an $rp \times sq$ (or smaller) image array $I(*,*)$, and to access any $1 \times pq$ or $p \times q$ array of $I(*,*)$. A data register 39 is provided to hold any of these pq element subarrays prior to storage or following retrieval of the image information from the memory modules. Also included are permuters 47 and 49. Permuters generally are specialized circuits for rearranging data. In the context of this invention, the permuters 47 and 49, respectively, rotate subarrays to the right and to the left. Functionally, the permuters route elements of the subarrays to or from the appropriate memory modules for storage and retrieval. Control of the permuters is resident in the address and control circuitry 7 and connectable thereto over path 15.

When a particular subarray is to be stored in the memory system, the one bit t register is set to one of the values $t=0$ or $t=1$ in order to indicate whether the subarray shape is $1 \times pq$ or $p \times q$. The $i$ and $j$ registers 3 and 5 are set to indicate coordinates of the upper lefthand element $I(i,j)$ of the subarray. The subarray itself is placed in data register 39 in row major order, such that $I(i,j)$ is in the leftmost position of the register. Based upon the values of $t$, $i$ and $j$, the control portion of address and control circuitry 7 provides a control signal on line 15 which causes permuter 47 to route each element of the subarray over counterpart paths 27, 31, and 35 to that module within which it is to be stored. The address portion of address and control circuitry 7 calculates its location within that module the address information is supplied via lines 9, 11 and 13 to memory modules 21, 23 and 25. Finally, a write signal from an external read/write control source 17 causes the pq elements of the subarray to be stored simultaneously in the different memory modules.

When a particular subarray is to be retrieved from the memory system, the $t$, $i$, and $j$ registers are set as described above so as to indicate the shape of the subarray and to identify its upper lefthand element. The address portion of the address and control circuitry 7 uses the values of $t$, $i$ and $j$ in order to calculate for each memory module the location of the unique element of the subarray which it contains. After the calculations are made, a read signal from 17 causes the pq elements of the subarray to be retrieved from the modules and routed by permuter 49 to data register 39 over paths 51, 53, and 55. The control portion of address and control circuitry 7 provides a control signal on line 15 which causes permuter 49 to arrange the elements of the subarray in row major order, such that $I(i,j)$ is routed to the leftmost position of register 39.

Whenever a $1 \times pq$ or $p \times q$ subarray of $I(*,*)$ is retrieved from or stored into the memory system, the address portion of the address and control circuitry 7 must calculate, for $0 \leq k<pq$, the location $l(i,j,k,t)$ of the unique element $e(i,j,k,t)$ of the subarray either contained by or to be placed in the kth memory module. The control circuitry portion of address and control circuitry 7 must, in combination with permuters 47 and 49, arrange for element $e(i,j,k,t)$ to be routed to or from the appropriate position in register 39. Table 1 summarizes the address calculations and routing patterns required for access to a subarray whose upper left-hand element is image point $I(i,j)$. The routing pattern specification indicates which of the $pq$ positions $d(0), d(1), \ldots, d(pq-1)$ of data register 39 is to receive or supply element $e(i,j,k,t)$.

TABLE 1

| Subarray Shape | t | Address Calculation | Required Routing |
|---|---|---|---|
| 1 × pq | 0 | M(i,j)=(iq+j)//pq;<br>g(i,j,k)=[k−M(i,j)]//pq;<br>l(i,j,k,t)=(i/p)s+[j+g(i,j,k)]/q. | e(i,j,k,t)   d[g(i,j,k)]. |
| p × q | 1 | M(i,j)=(iq+j)//pq;<br>g(i,j,k)=[k−M(i,j)]//pq;<br>l(i,j,k,t)=[(i+g(i,j,k)/q)/p]s+(j+g(i,j,k)//q)/q. | e(i,j,k,t)   d[g(i,j,k)]. |

Exemplary circuitry implementing the above address calculations and routing patterns is amply set forth in FIGS. 3–9, which are described below. Of course it should be understood that alternative circuitry, for example, circuitry based upon table lookup could be designed to perform the same functions.

The address calculations and routing patterns noted above are based upon a predetermined distribution of image points among the pq memory modules. Before describing the preferred embodiment, appreciation of the true nature and scope of the invention will be enhanced by first considering the justification for the chosen distribution strategy, and the manner in which the distribution leads to the address calculations and routing patterns summarized in Table 1.

DISTRIBUTION STRATEGY

As state previously, it is an object of the invention to construct a memory system capable of storing an $rp \times sq$ image array I(*,*) consisting of image points $I(i,j)$, where $i$ lies in the range $0 \leq i<rp$ and $j$ lies in the range $0 \leq j<sq$. Furthermore, the memory system is required to store the image in a manner permitting access to all $1 \times pq$ and $p \times q$ subarrays of I(*,*).

If the memory system outlined in FIG. 1 is to store the image array I(*,*), then for each image point $I(i,j)$ it is necessary to determine which of the pq memory modules 21, 23, or 25 should store $I(i,j)$. It was observed that when memory modules were assigned the memory module numbers 0, 1 . . . , $pq-1$ as indicated in FIG. 1, the distribution of image points among the memory modules could be described succintly by specifying an integer-valued module assignment function $M(i,j)$ with the following characteristic:

for any integers $i$ and $j$ on the ranges $0 \leq i<rp$ and $0 \leq j<sq$, the value of $M(i,j)$ lies in the range $0 \leq M(i,j)<pq$. Each image point I(i,j) is then stored in the M(i,j)th memory module.

If the memory system outlined in FIG. 1 is to store the image array I(*,*) in a manner permitting simultaneous access to the pq image points in any $1 \times$ pq subarray of I(*,*), then these images must be stored in different memory modules. This is because only one storage cell of each memory module is randomly accessible at a single instant of time. Similarly, if the memory system in FIG. 1 is to store the image array I(*,*) in a manner permitting simultaneous access to the $pq$ image points in any $p \times q$ subarray of I(*,*), than these image points must be stored in different memory modules.

It was unexpectedly observed that if the module assignment function $M(i,j)$ assumed the form $M(i,j)=(iq+j)//pq$, where $(iq+j)//pq$ denotes the remainder resulting from the integer division of the quantity $(iq+j)$ by the quantity $pq$, then the pq image points of every $1 \times pq$ and $p \times q$ subarray would be stored in different memory modules. This would permit simultaneous accessing of the $pq$ image points in the desired subarrays.

The module assignment function $M(i,j)=(iq+j)//pq$ is illustrated in FIG. 2A for the case that $p=q=r=4$ and $s=8$. The hexidecimal number in the $j$th position of the ith row of the $16 \times 32$ array in FIG. 2A denotes the memory module $M(i,j)$ for storing image point $I(i,j)$. For example, the circled entry in the 5th position of the 6th row is D, which is the hexidecimal notation for 13. This indicates that the image point I(6,5) is stored in the 13th memory module. This may be calculated as $M(i,j)=M(6,5)=(iq+j)//pq=(6\times4+5)//4\times4=29//16=13$.

It should be readily observed from FIG. 2A that the $pq=16$ image points in any $1 \times pq = 1 \times 16$ subarray are stored in different memory modules. For example, the 16 element horizontal sequence indicated in FIG. 2 shows that the image points I(6,13), I(6,14), . . . , I(6,28) are stored, respectively, in memory modules 5, 6, 7, 8, 9, 10, 11, 12, 13, 14, 15, 0, 1, 2, 3, 4. Also, it will be observed from FIG. 2A that the pq=16 image points in any $p \times q= 4\times4$ subarray are stored in different memory modules. For example, the 4×4 block indicated in FIG. 2A identifies the memory module assignments for the image points in the 4×4 subarray whose upper lefthand element is the image point I(9,6).

The above module assignment function $M(i,j)$ assigns $rs$ image points to each of the $pq$ memory modules without specifying the cell locations in which they are to be stored. It was unexpectedly observed that the image points could be conveniently stored in location $A(i,j)$ of memory module $M(i,j)$ if such a function varied according to the form $A(i,j)=(i/p)s+(j/q)$, where $i/p$ and $j/p$ are integer quotients.

Figure 2B:
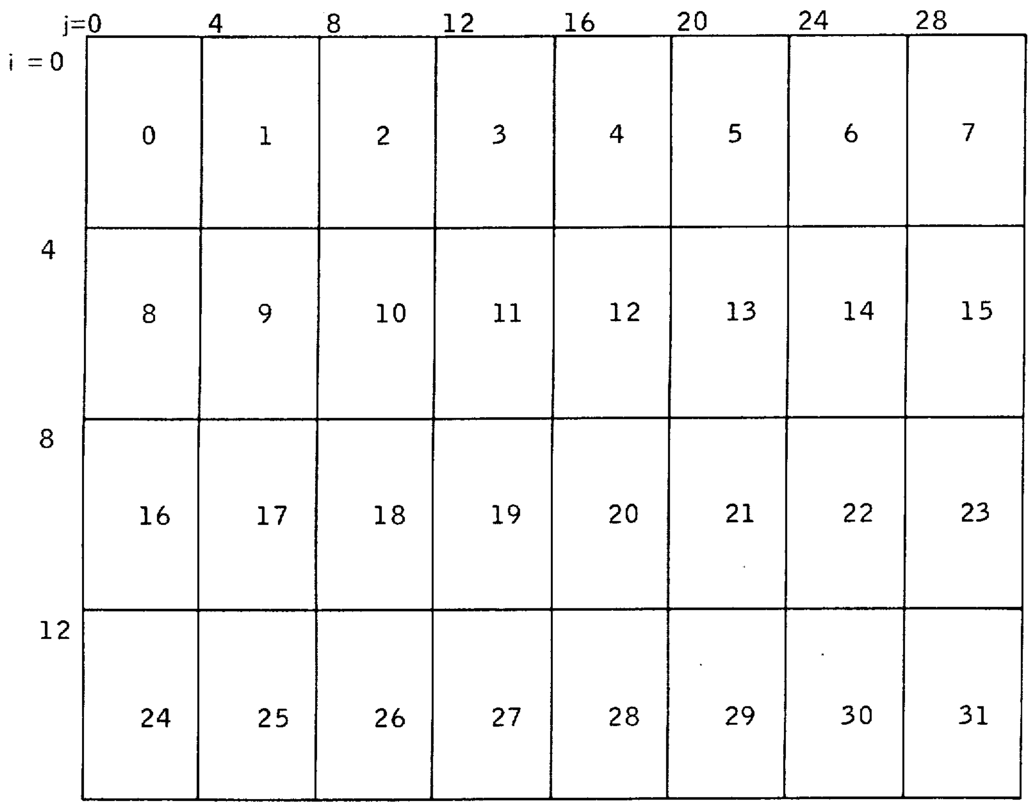
FIGS. 2A and B illustrate the module assignment and the address assignment for the case that $p=q=4$, $r=4$, and $s=8$.

The address assignment function A(i,j) is illustrated in FIG. 2B for the case that $p=q=r=4$ and $s=8$. The decimal integer within each $p \times q = 4\times4$ block indicates the address of the corresponding $pq=16$ image points. For example, the fifth position on the sixth row falls in the 4×4 block labeled with decimal 9. This indicates that image point I(6,5) is stored in the 9th cell of memory module M(6,5). This may be calculated as $A(i,j)=A(6,5)=(6/4(8+(5/4)=(1)8+(1)=9$.

ADDRESS CALCULATION

When any of the $1 \times pq$ or $p \times q$ subarrays is to be accessed (read or written), the address calculation portion of address and control circuitry 7 shown in FIG. 1 must calculate, for $0 \leq k<pq$, the address of the unique image point in the subarray stored by the kth memory module.

Stated algebraically if the upper lefthand element of the desired $1\times pq$ or $p \times q$ subarray is image point $I(i,j)$, and if the Boolean variable t is set to one of the values $t=0$ or $t=1$ to indicate, respectively, whether a $1\times pq$ or a $p \times q$ subarray is to be accessed, then the address to be calculated for module $k$ can be denoted $l(i,j,k,t)$. The form of this address function was noted previously in Table 1, and it can be justified by the following argument.

Suppose that access to a $1 \times pq$ subarray is desired, so that $t=0$. As discussed previously, the module assignment function $M(i,j)=(iq+j)//pq$ guarantees that module $k$ stores one of the desired image points $I(i,j)$, $I(i,j+1)$, . . . , $I(i, j+pq-1)$. Equivalently, module $k$ stores image point $I(i,j+b)$ where b is an integer lying in the range $0 \leq b<pq$. The distribution of image points among memory modules guarantees that image point $I(i,j+b)$ is stored in location $A(i,j+b)=(i/p)s+(j+b)/q$ of memory module $M(i,j+b)=(iq+j+b)//pq$. It follows, therefore, that $k=M(i,j+b)$ and that $l(i,j,k,t)=A(i,j+b)$. The foregoing relations can be used to show that $b=[M(i,j+b)-iq-j]//pq,= [k-iq-j]//pq$. Hence, defining the function $g(i,j,k)=(k-iq-j)//pq$, we conclude that $b=g(I,j,k)$, and that when $t=0$, $l(i,j,k,t)= A(i,j+b)=(i/p)s+(j+b)/q=(i/p)s+[j+g(i,j,k)]/q$.

Similarly, let it be supposed that access to a $p \times q$ subarray is desired. Thus, $t-1$. As a consequence of the module assignment function $M(i,j)$, module $k$ stores one of the desired image points $I(i,j)$, $I(i,j+1)$, . . . , $I(i,j+q-1)$, $I(i+1,j)$, . . . , $I(i+p-1, j+q-1)$. Equivalently, module $k$ stores image point $I(i+a,j+b)$, where the integers $a$ and $b$ lie in the respective ranges $0 \leq a<p$ and $0 \leq b<q$. However, the distribution of image points among memory modules guarantees that image point $I(i+a,j+b)$ is stored in location $A(i+a,j+b)=\lambda[(i+a)/p]s+(j+b)/q$ of memory module $M(i+a,j+b)=(iq+aq+j+b)//pq$. Therefore, it follows that $k=M(i+a,j+b)$ and that $l(i,j,k,t)= A(i+a,j+j+b)$. The foregoing relations can be used to show that $aq+b=[M(i+a,j+b)-iq-j]//pq=(k-iq-j)//pq$. Hence by defining the function $g(i,j,k)=(k-iq-j)//pq$, we conclude that $a=g(i,j,k)/q$ and $b=g(i,j,k)//q$, and that when $t=1$, $l(i,j,k,t)= A(i+a,j+b)=[(i+a)/p]s+(j+b)/q=[(i+g(i,j,k)/q)/p]s+(j+g(i,j,k)//q)/q$.

ROUTING PATTERNS

As stated previously, whenever any $1 \times pq$ or $p \times q$ subarray of the image array $I(*,*)$ is stored into or retrieved from the memory shown in FIG. 1, each of the memory modules 21, 23, and 25 stores or retrieves a single element of the subarray. Relatedly, the elements of this subarray are routed by permuter 47 from data register 39 to the memory modules for store operations. Likewise, the subarray elements are routed by permuter 49 from the memory modules to the data register for retrieval operations. The operation of permuters 47 and 49 are controlled by a signal on line 15 provided by the control portion of the address and control circuitry 7.

Stated algebraically, it is apparent that if the upper lefthand element of the $1 \times pq$ or $p \times q$ subarray to be accessed is the image point $I(i,j)$, and if the Boolean variable $t$ is set to one of the values $t=0$ or $t=1$ so as to indicate, respectively, whether a $1 \times pq$ or $p \times q$ subarray is to be accessed, then the unique subarray element to be stored into or retrieved from module k can be denoted $e(i,j,k,t)$, This element must be routed to or from one of the pq positions $d(0), d(1), \ldots, d(pq-1)$ of the data register, as indicated previously in Table 1. The routing pattern specified in Table 1 can be justified by the following arguments.

Suppose that a $1 \times pq$ subarray is to be accessed, so that $t=0$. Since the subarray is held in row major order in the data register, element $I(i,j+b)$ of the subarray should be routed to or from position $d(b)$ of the data register. As described in the last section, image point $I(i,j+b)$ is stored in memory module $k$, where $k$ and $b$ are related according to the formula $b=(k-iq-j)//pq=\lambda g(i,j,k)$. Therefore, the unique element of the $1 \times pq$ subarray to be retrieved from or stored into module $k$, namely $I(i,j+b)=e(i,j,k,t)$, is routed to or from position $d(b)=d(g(i,j,k))$ of the data register.

Similarly, suppose that access to a $p \times q$ subarray is desired, so that $t=1$. Then since the subarray is held in row major order in the data register, element $I(i+a,j+j+b)$ of the subarray array sould be routed to or from position $d(aq+b)$ of the data register. As described in the last section, image point $I(i+a,j+b)$ is stored in memory module $k$, where $k$ is related to a and b according to the formula $aq+b=(k-iq-j)//pq=g(i,j,k)$. Therefore, the unique element of the $p \times q$ subarray to be retrieved from or stored into module $k$, namely, $I(i+a,j+b)=e(i,j,k,t)$, is routed to or from position $d(aq+b)= d(g(i,j,k))$ of the data register.

STRUCTURAL DESIGN

Figure 3:
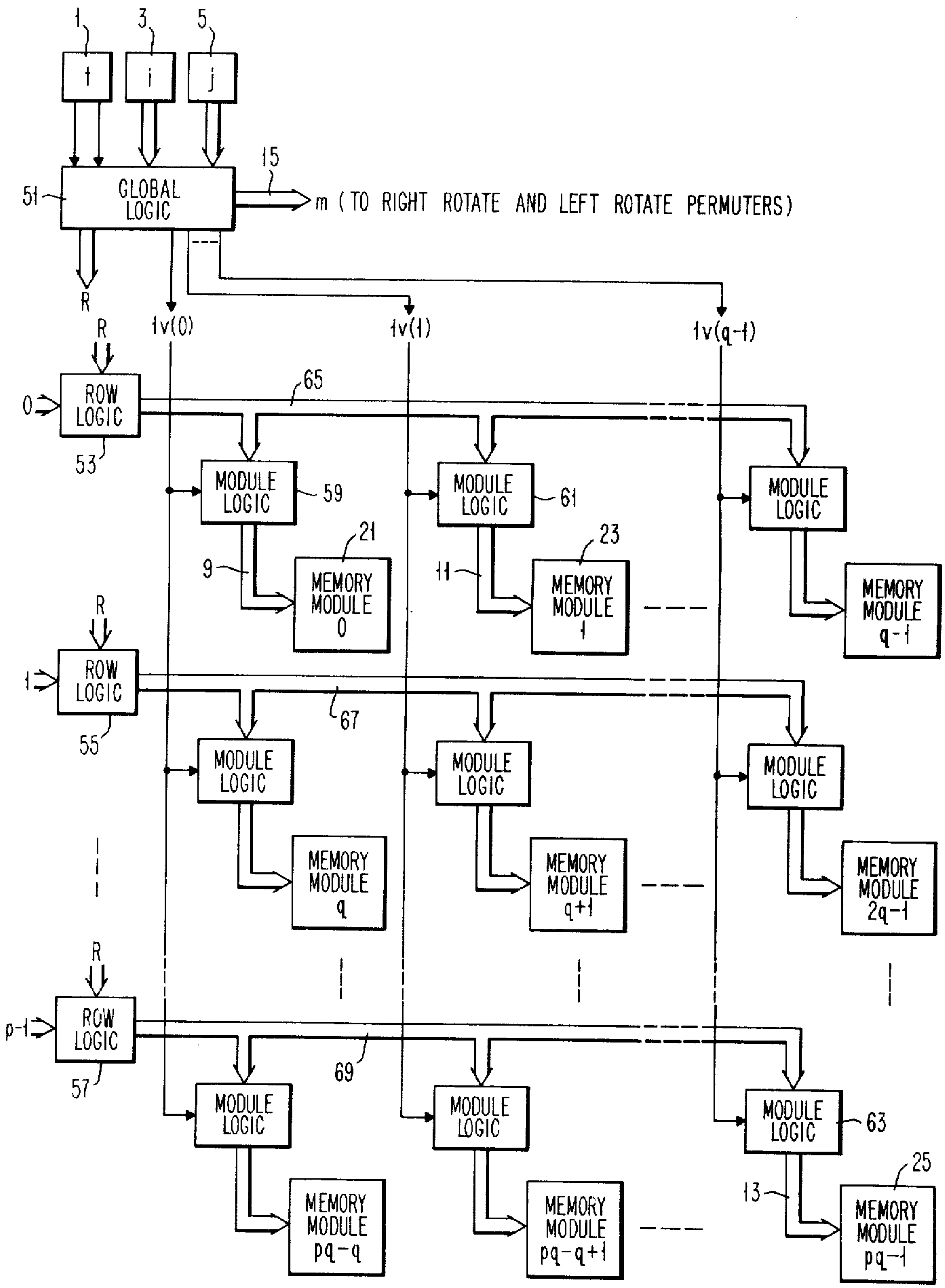
FIG. 3 shows the selective logical details of the address and control circuitry set forth in FIG. 1.

Referring now to FIG. 3, there is provided an overview of the address and control circuitry 7 shown in FIG. 1. As indicated in FIG. 3, the $pq$ memory modules 21, 23, and 25 are arranged into $p$ rows of $q$ modules each. The address and control circuitry comprises: a single global logic component 51; $p$ identical row logic components 53, 55, and 57, one for each row of memory modules; and pq identical module logic component 59, 61 and 63, one for each memory module.

The global logic component 51 operates in response to the subarray shape designation t and the subarray starting coordinates i and j for calculating the quantities $M(i,j)$, R, and $lv(0), lv(1), \ldots, lv(q-1)$. The quantity $M(i,j)$ is used to control permuters 47 and 49 over path 15, as shown in FIG. 1. The quantity R consists of values used by row logic components 53, 55, and 57. The quantities $lv(0), lv(1), \ldots, lv(q-1)$ are used by module logic components 59, 61 and 63.

Each of the row logic components 53, 55 and 57 operates in response to a fixed row designation number, and in response to the quantity R calculated by the global logic component 51, to calculate address information used for the calculation of cell addresses for memory modules in the associated row of modules. This address information is provided over lines 65, 67, and 69 to the module logic components connected to these memory modules.

Each of the module logic components 59, 61, and 63 operates in response to the address information calculated by one of the row logic components 53, 55, and 57; and in response to one of the signals $lv(0), lv(1), \ldots, lv(q-1)$ calculated by the module logic component 51, in order to formulate a cell address. In particular, the module logic component associated with the $k$th memory module calculates the cell address $l(i, j, k, t)$. The cell addresses are supplied to the respective memory modules over lines 9, 11, and 13.

Figure 4:
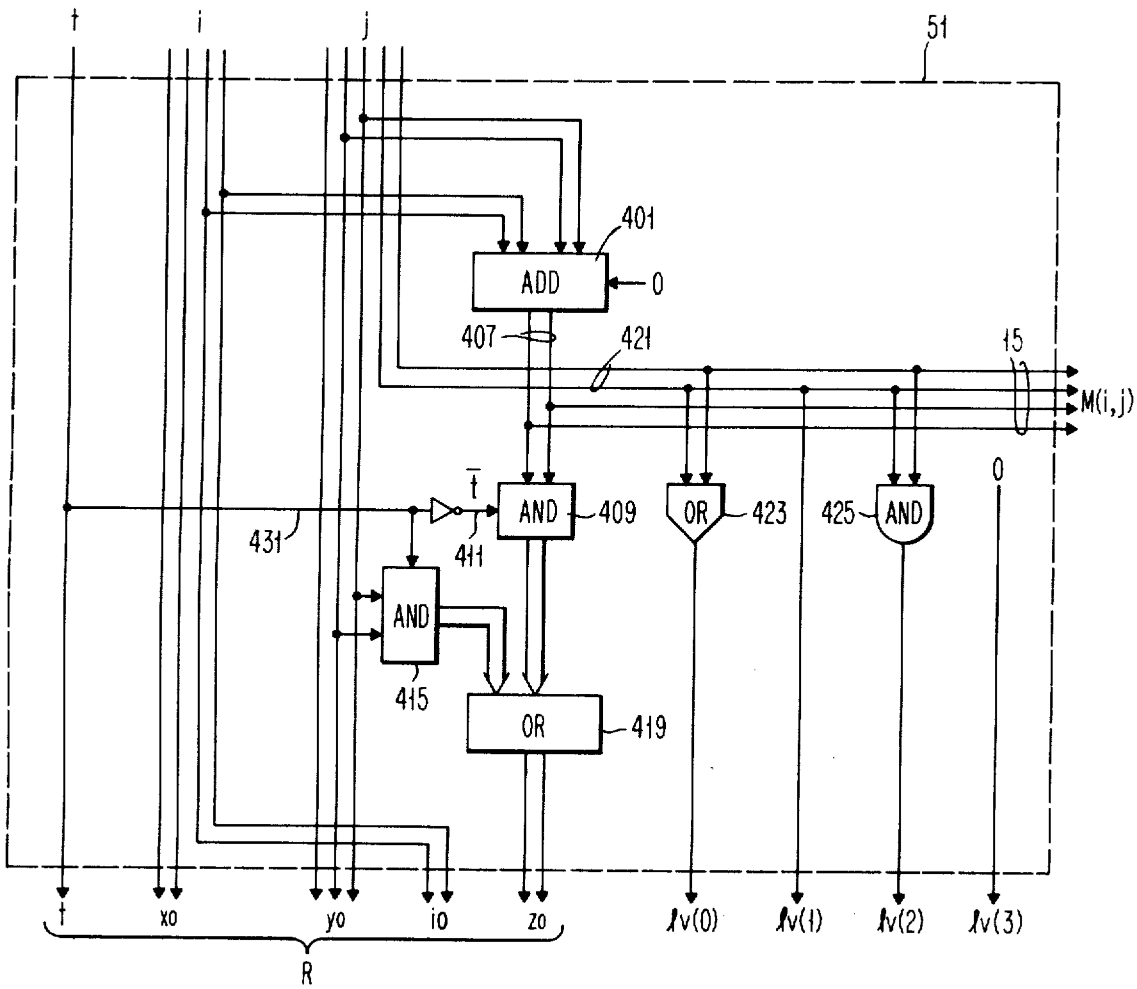
FIGS. 4–6 illustrate detailed logical designs of the global, row, and module logics of the counterpart functional elements seen in FIG. 3.
Figure 5:
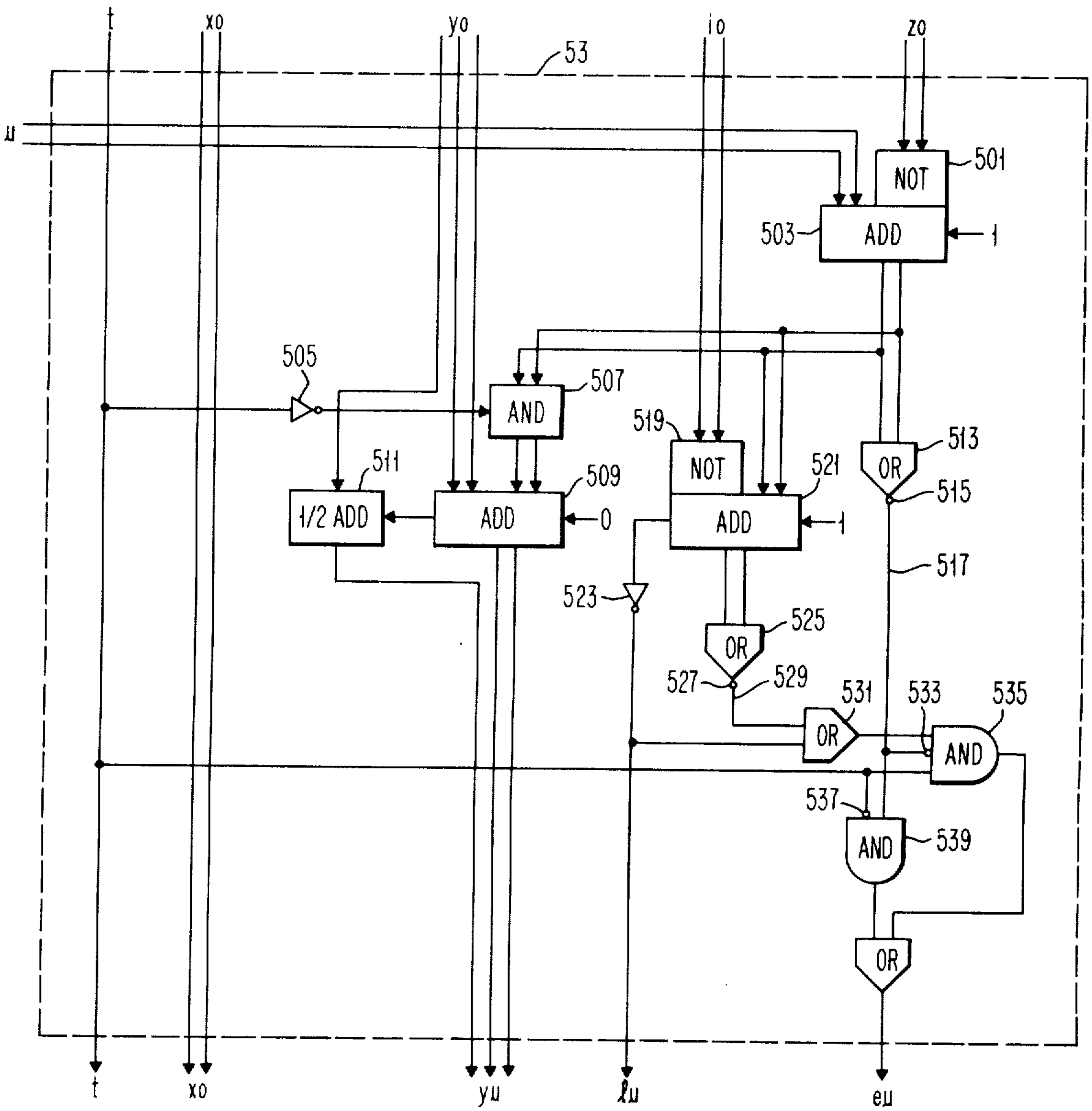
Figure 6:
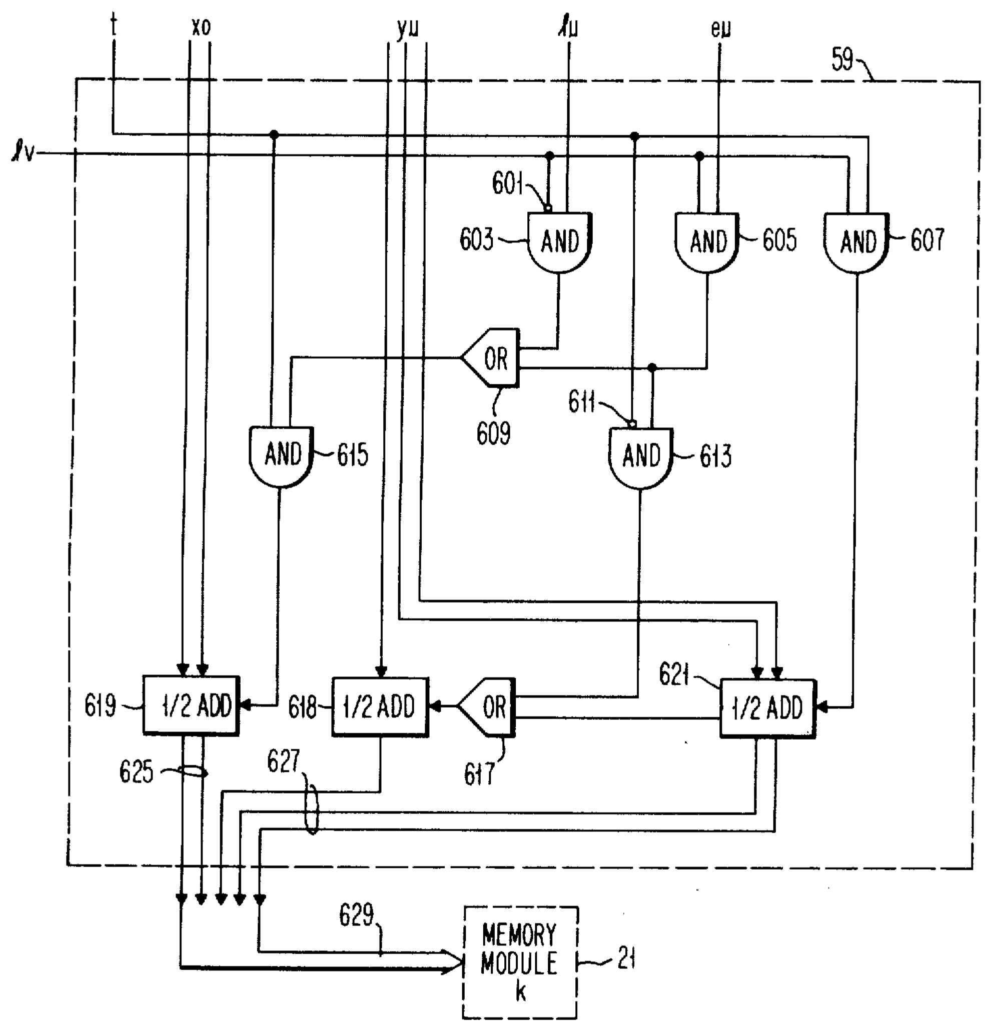

FIGS. 4–6 provide, respectively, detailed descriptions of: the global logic component 51; one of the row logic components 53, 55, and 57; and one of the module logic components 59, 61, and 63. The operation of each component is described both algebraically and with an exemplary circuit design. The algebraic descriptions summarize the inputs to, outputs from, and calculations performed by each of the components. These algebraic descriptions are appropriate for any combination of design parameters $p$, $q$, $r$, and $s$. The exemplary circuit designs are specific for the case that $p=q=r=4$ and $s=8$.

Referring now to FIG. 4, there is provided a detailed description of the global logic component 51. The inputs to this circuit are the subarray shape designation $t$ and the subarray starting location coordinates $i$ and $j$. The outputs from this circuit are the quantities $M(i,j)$, R, and $lv(0), lv(1), \ldots, lv(q-1)$. As indicated, the output quantity R comprises a bundle of control signals consisting of values $t$, $xo$, $io$, $yo$, and $zo$. Each of these values is calculated by the global logic component according to the formulas provided in FIG. 4.

The first two values to be calculated by the global logic component are quantities $xo=i/p$ and $io=i//p$. That is, $xo$ and $io$ are the quotient and the remainder that result from the integer division of $i$ by $p$. Since the image coordinate $i$ is a binary coded integer, and since $p=4$ for the exemplary circuit in FIG. 4, io is just the least significant two bits of $i$, and $xo$ is the remaining bits of $i$.

The next two values to be calculated by the global logic component are the quantities $yo=j/q$ and $vo=j//q$. Since the image coordinate $j$ is a binary-coded integer, and since $q=4$ for the exemplary circuit in FIG. 4, $vo$ and $yo$ are, respectively, the least significant two bits of $j$ and the remaining bits of $j$.

Another value to be calculated by the global logic component is the quantity $uo=(io+yo)//p$. That is, $uo$ is the remainder that results from the integer division by $p$ of the sum of the two previously calculated quantities $io$ and $yo$. For the exemplary circuitry in FIG. 4 the quantities $io$ and $y$ are supplied over lines 405 and 403 to adder 401, which calculates their sum. Since $p=4$ for the exemplary circuit, the desired quantity $uo=(io+yo)//p$ is just the least significant two bits of the sum outputted from adder 401 on lines 407.

Another value to be calculated by the global logic component is the quantity $M(i,j)=(iq+j)//pq$. This quantity can be calculated from the two previously calculated quantities $uo$ and $vo$ according to the relation $M(i,j)=uo{\cdot}q+vo$. Since $vo$ and $uo$ are binary numbers, since $vo < g$, and since $q=4$ for the exemplary circuit in FIG. 4, the calculation $M(i,j)=uo\,q+vo$.can be achieved simply by concatenating (juxtapositioning) the values $uo$ and $vo$, appearing respectively on lines 407 and 421.

Another value to be calculated by the global logic component is the quantity $zo=\bar{t}.uo+t(yo//p)$. That is, if the shape designation value $t$ has the Boolean value $t=0$, then its logical complement $\bar{t}$ has the value $\bar{t}=1$, so that $zo$ assumes the value $zo=uo$. Conversely, if $t$ has the Boolean value $t=1$, then $\bar{t}=0$ and $zo=yo//p$. For the exemplary circuit in FIG. 4, $yo//p$ comprises the least significant two bits of the previously calculated quantity $yo$. The quantity $yo//p$ is supplied to over lines 417 to AND gates 415. The quantity $t$ comprises a second input to AND gates 415. Similarly, the quantity $\bar{t}$ calculated by INVERTER 411 is supplied to AND gates 409, along with the quantity $uo$ calculated by adder 401 and appearing on line 407. The outputs from AND gates 409 and 415 are in turn supplied to OR gates 419. The output from OR gates 419 constitutes the desired quantity $zo$.

The final values to be calculated by the global logic component are the quantities $1v(0)$, $1v(1)$, . . . , $1v(q-1)$. For integer values of $k$ on the range $0 \leq k<q$, $1v(k)$ is defined to have the value $1v(k)=1$ if $k < vo$ and the value $1v(k)=0$ if $k \leq vo$, where $vo$ is the previously calculated quantity appearing on lines 421. Symbolically, this written $1v(k)=LT(k,vo)$. The quantity $1v(0)$ is calculated by OR gate 423, and has the Boolean value $1v(0)=1$ if either bit of $vo$ is 1. Similarly, $1v(1)=1$ if the most significant bit of $vo$ is 1, and $1v(2)=1$ if both bits of $vo$ are 1, as determined by AND gate 425. Finally, $1v(3)=0$, because the two-bit value $vo$ cannot be larger than 3.

Referring now to FIG. 5, there is provided a detailed description of one of the row logic components 53, 55, or 57 as shown in FIG. 3. More particularly, the row logic component associated with the uth row of memory modules is described, where $u$ lies in the range $0 \leq u<p$. The inputs to this row logic component are the row designation number $u$ and the bundle of signals R. R comprises the values $t$, $xo$, $yo$, $io$, and $zo$ provided by the global logic component 51. The outputs from the row logic component consist of the values $t$, $xo$, $yu$, $lu$, and $eu$ calculated according to the formulas provided in FIG. 5. These values comprise address information used in the calculation of cell addresses for memory modules on the $u$th row of modules.

The first value to be calculated by the row logic component is the quantity $z=(u-zo)//p$. For the exemplary circuit in FIG. 5, INVERTER gates 501 and Adder 503 serve to subtract $zo$ from $u$, according to the well-known relation $u-zo=u+\overline{zo}+1$. Since $p=4$, the least significant two output bits from Adder 503 comprise the desired quantity $z$. INVERTER 505 and AND gates 507 supply the quantity $\bar{t}.z$ to Adder 509, and hence Adder 509 and Half-adder 511 serve to calculate $yu=yo+t.z$.

Another value to be calculated by the row logic component is the quantity $eul=EQ(z,O)$. That is, $eul$ is a Boolean variable with the value $eul=1$ if $z+0$ and with the value $eul=0$ if $z \neq 0$. In FIG. 5, OR gate 513 and INVERTER 515 determine whether $z=0$ and provide the signal $eul=EQ(z,0)$ on line 517.

Additional values to be calculated by the row logic component are the Boolean variables $lu=LT(z,io)$ and $eu2=EQ\ (z,io)$. That is, $lu=1$ if $z < io$ and $eu2=1$ if $z=io$. In FIG. 5, INVERTER gates 519 and Adder 521 serve to subtract $io$ from $z$ according to the relation $z-io=z+\overline{io}+1$. INVERTER 523 operates on the carry from Adder 521 to calculate $lu=LT(z-io,o)=LT(z,io)$, while OR gate 525 and INVERTER 527 provide the signal $eu2=EQ(z-io,o)=EQ(z,io)$ on line 529.

The final value calculated by the row logic component is the Boolean variable $eu=\bar{t}.eul+t.\overline{eul}(lu+eu2)$. In FIG. 5, this variable is calculated by OR gates 531 and 541, INVERTER gates 533 and 537, and AND gates 535 and 539.

Referring now to FIG. 6, there is shown a detailed description of one of the module logic components 59, 61, or 63 of FIG. 3. More particularly, the module logic component associated with the kth memory module is shown, where $k$ lies on the range $0 \leq k<pq$. The inputs to this circuit are the quantity $lv(k//q)$ calculated by the global logic component 51, and the quantities $t$, $xo$, $yu$, $lu$, and $eu$ calculated by the row logic component associated with the $u$th row of memory modules, where $u=k/q$. The single output from the module logic component is the cell address $1(i,j,k,t)$ calculated according to the formulas provided in FIG. 6. Note that the combinational logic interior to the kth memory module responsive to the cell address $1(i,j,k,t)$ may be fashioned according to any one of numerous methods, as for example, that shown in "Logical Design for Digital Computers" by Montgomery Phister, John Wiley and Sons, New York, 1958.

The first value to be calculated by the module logic component is the quantity $x=xo+t(\overline{lv}.lu+lv.eu)$. Here $lv$ denotes the value $lv(k//q)$ received from the global logic component 51. In FIG. 6, the desired Boolean value $t(\overline{lv}.lu+lv.eu)$ is obtained by operation of INVERTER 601, AND gates 603, 605, and 615, and OR gate 609. This Boolean value is then added to xo by Half-adder 619. This provides the value $x$ on lines 625.

The next value to be determined by the module logic is the quantity $y=yu+p.\bar{t}.eu.lv+t.lv$. From this formula it is clear that, since either $t=0$ or $\bar{t}=0$, $y$ is achieved by adding either 0, 1, or $p$ to $yu$, with the value added determined by the Boolean variables $t$, $eu$, and $lv$. In FIG. 6, the Boolean variable $t.lv$ is calculated by AND gate 607 and is supplied over line 608 to Half-adder 621. The Boolean variable $\bar{t}.eu.lv$ is calculated by AND gates 605 and 613, operating in conjunction with INVERTER 611, and is then supplied over line 614 to OR gate 617. If $t.lv=l$, then necessarily $t=1$ and $\bar{t}=0$, so that $\bar{t}.eu.lv=0$. In this case Half-adders 621 and 623 add $t.lv=1$ to the quantity $yu$, with any carry generated by Half-adder 621 being routed to Half-adder 623 via OR gate 617 and line 618. Alternatively, if $\bar{t}.eu.lv=1$, then necessarily $t=0$ and $\bar{t}=1$, so that $t.lv=0$. In this case the value $t\ eu\ lv=1$ is routed via OR gate 617 and line 618 to Half-adder 623, and thus is added to the most significant bit of $yu$. Since Half-adder 621 adds the value $t.lv=0$ to the least significant two bits of $yu$, the net result is that Half-adders 621 and 623 add $p=4$ to $yu$, as desired. In all cases, the desired quantity $y=yu+p.\overline{t}.eu.lv+t.lv$ is provided on lines 627.

The final value to be ascertained by the module logic associated with the kth memory module is the cell address $l(i,j,k,t)=x.s+y$. For the exemplary circuit in FIG. 6, $s=8$ and $y < 8$, so that $l(i,j,k,t)$ can be achieved simply by juxtapositioning the values $x$ and $y$ appearing, respectively, on lines 625 and 627. The cell address $l(i,j,k,t)$ is supplied to memory module $k$ over lines 629.

Figure 7:
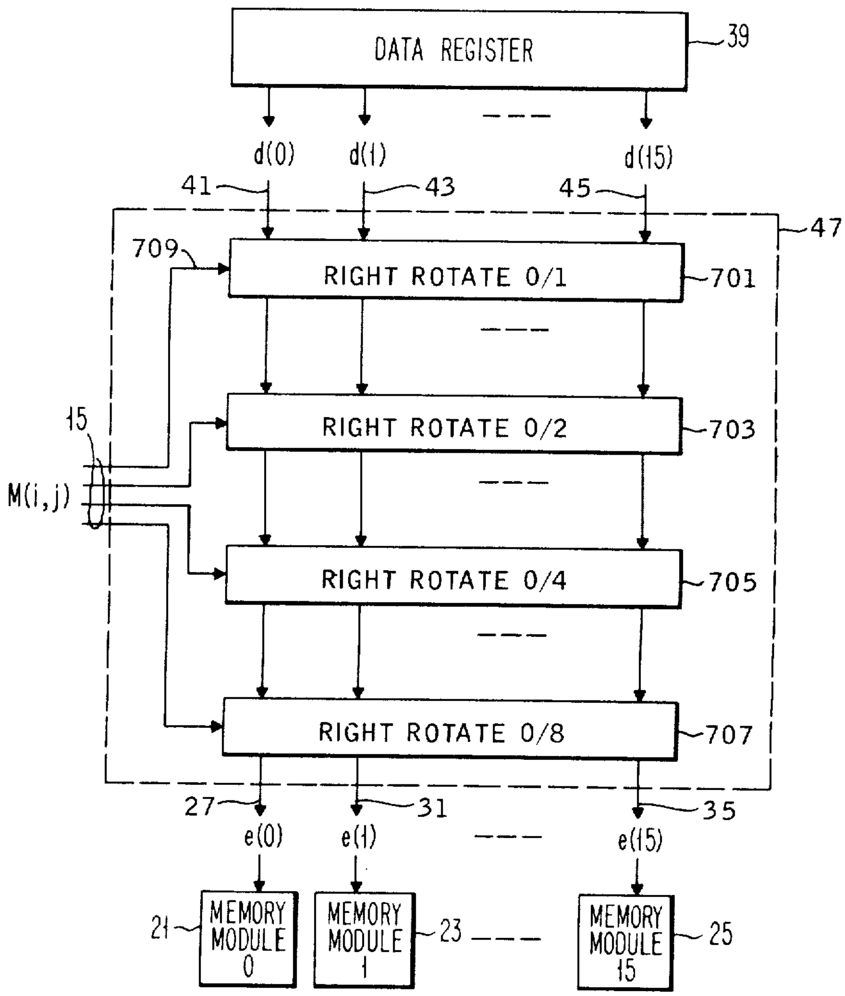
FIGS. 7–9 show detailed logic for the routing circuitry seen in FIG. 1.
Figure 8:
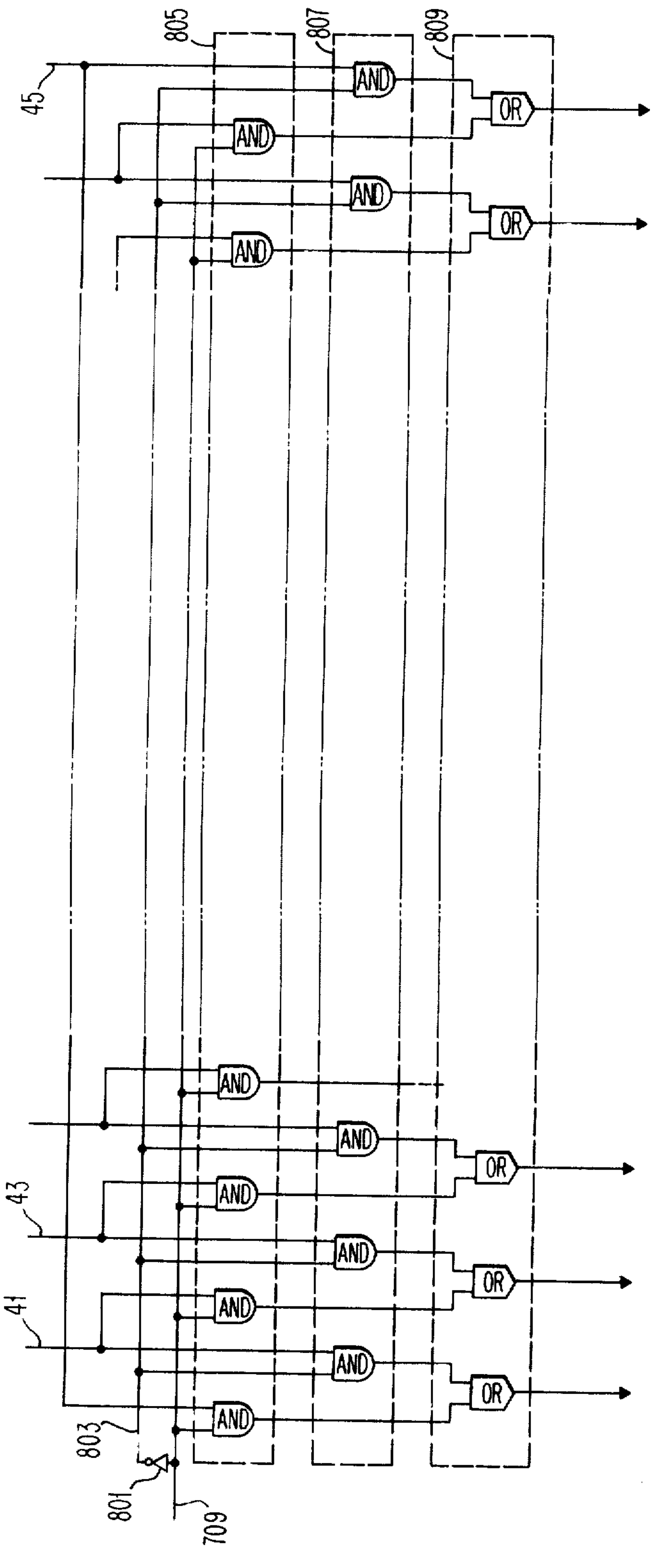
Figure 9:
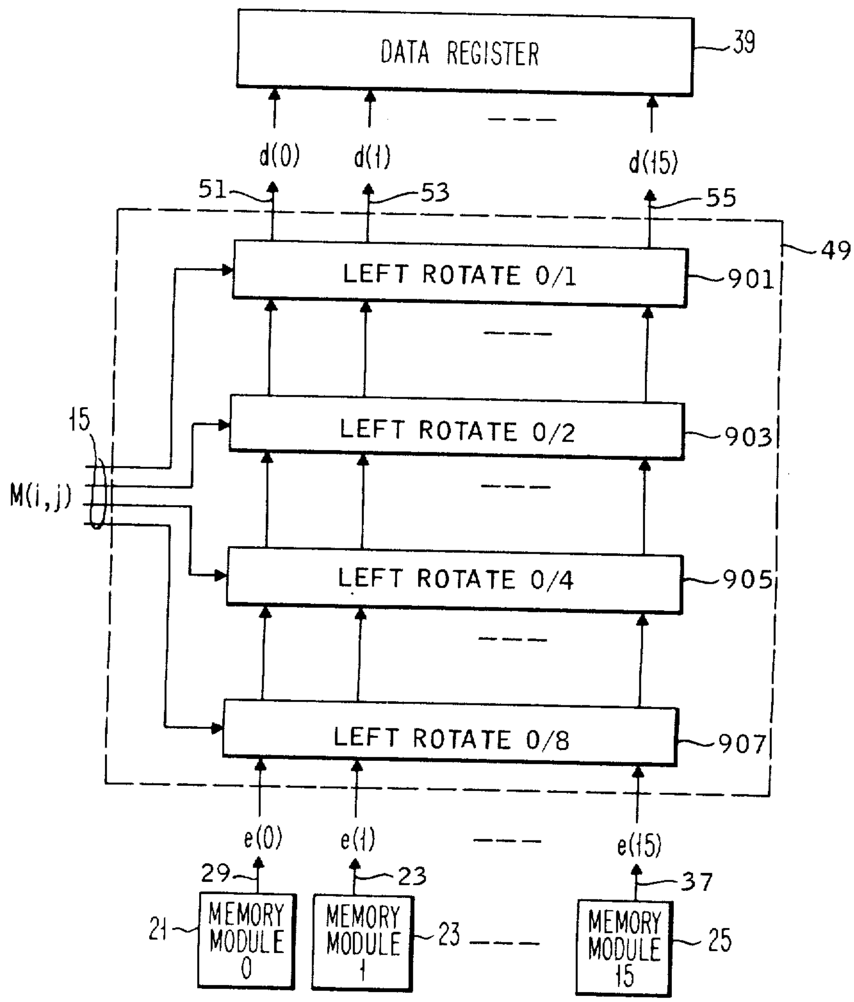

FIGS. 7–9 illustrate the routing circuitry 8 shown in FIG. 1. The primary functions of this circuitry are to route the image points of any $1 \times pq$ or $p \times q$ array of points between memory modules 21, 23, and 25 and the data register 39. Restated, the circuitry must respond to an appropriate control signal $M(i,j)$ on line 15 by routing image points between memory modules and the appropriate positions of the data register. The routing circuity 8 comprises right rotate permuter 47 and left permuter 49. FIGS. 7–9 describe the operation of the routing circuitry both algebraically and with an exemplary circuit design. The algebraic descriptions are appropriate for any combination of design parameters $p$, $q$, $r$ and $s$, although the exemplary circuit design is specific for the case that $p=q=r=4$ and $s=8$.

Referring now to FIG. 7, there is set forth a logic design of right rotate permuter 47. One input to this circuit is the quantity $M(i,j)$ calculated by the global logic component 51, which is provided in lines 15. The remaining inputs are the pq image points held in data register 39, which are supplied on lines 41, 43, and 45. These image points are outputted to the respective memory modules on lines 27, 31, and 35, according to the following rule. The kth memory module receives the image point held in the $g(i,j,k)$th position of the data register, where the function $g(i,j,k)$ is defined by the relation $g(i,j,k)=[k-M(i,j)]//pq$. This routing is achieved by rotating the contents of data register 39 by $M(i,j)$ positions.

The circuit in FIG. 7 uses four simple permuters 701, 703, 705, and 707 to achieve the desired rotation. Each of these simple permuters responds to a single bit of the quantity $M(i,j)$ by rotating its inputs by a predetermined amount if the bit of $M(i,j)$ is a 1 and by not rotating its inputs if that bit of $M(i,j)$ is a 0. For example, FIG. 8 depicts the simple permuter 701 that responds to the least significant bit of $M(i,j)$ supplied thereto on line 709. If the bit on line 709 is a logical 0, then AND gates 805 are blocked and INVERTER 801 provides a logical 1 on line 803 which enables AND gates 807. The inputs on lines 41, 43, and 45 are thus supplied without rotation to the outputs, via AND gates 807 and OR gates 809. Conversely, if the bit on line 709 is a logical 1, then this value enables AND gates 805 while INVERTER 801 provides a blocking signal on line 803 to AND gates 807. The inputs on lines 41, 43, and 45 are thus rotated to the right by one position and supplied to the outputs by AND gates 805 and OR gates 809.

Referring now to FIG. 9, there is shown an embodiment of the left rotate permuter 49. One input to this circuit is the quantity $M(i,j)$ calculated by the global logic component 51, which is provided on lines 15. The remaining inputs are the $pq$ image points being accessed from memory modules 21, 23, and 25, which are supplied on lines 29, 33, and 37. These image points are outputted to the data register 39 on lines 51, 53, and 55 according to the following rule. The image point supplied by the kth memory module is routed to the $g(i,j,k)$th position of the data register, where the function $g(i,j,k)$ is defined by the relation $g(i,j,k)=[k-\lambda M(i,j)]//pq$. This routing is achieved by rotating by $M(i,j)$ positions the sequence of image points retrieved from the memory modules 21, 23 and 25.

The exemplary circuit in FIG. 9 uses four simple permuter 901, 903, 905, and 907 to achieve the desired rotation. Each of these simple permuters responds to a single bit of the quantity $M(i,j)$ by rotating its inputs by a predetermined amount if that bit of $M(i,j)$ is a 1 or by not rotating its inputs if that bit of $M(i,j)$ is a 0. These simple permuters are quite similar in design to the permuters 701, 703, 705, and 707 shown in FIGS. 7 and 8.

In summary a memory access method and apparatus has been described which permits access to all $1 \times pq$ and $p \times q$ subarrays within an image array of size $rp \times sq$ stored in a word organized random access memory if the data is distributed and accessed according to the predetermined relationships. The memory system implementing the distribution and functions requirres essentially only $pq$ memory modules, two variable rotate permuters, and associated access circuitry in order to provide access to the subarrays. Also, the memory system can be extended by an $n$ fold replication to handle grey scale or color images whose image points each require two or more bits of storage.

It is to be understood that the particular embodiment of the invention described above and shown in the drawings is merely illustrative and not restrictive on the broad invention, that various changes in design, structure and arrangement may be made without departure from the spirit of the broader aspects of the invention as defined in the appended claims.

What is claimed is:

1. A word organized random access memory system modified for image processing operations so that the pq image points of any $1 \times pq$ or $p \times q$ subarray of any $rp \times sq$ image array $I(*,*)$, of points storable in the memory system can be retrieved from or written into the system in a single memory cycle, each image point $I(i,j)$ assuming a Boolean value when $i$ and $j$ lie respectively in the ranges $0 \leq i<rp-1$ and $0 \leq j<sq-1$, the system comprising:

memory means (21, 23, 25) for storing $rpsq$ image points in the cells of $pq$ different memory modules, each memory module being an entity capable of storing $rs$ image points in distinguishable cells, only one cell of each module being accessible at any single instant of time; and accessing means (7, 39, 47, 49, FIGS. 3–9) for causing each image point $I(i,j)$ to be retrieved from or written into cell location $A(i,j)$ of the $M(i,j)$th memory module, where the integer valued functions $A(i,j)$ and $M(i,j)$ are defined by the relations:

$A(i,j)=(i/p)s+j/q$, wherein $i/p$ and $j/q$ are integer quotients, $M(i,j)=(iq+j)//pq$, wherein $(iq+j)//pq$ is the remainder resulting from the integer division of $iq+j$ by $pq$.

2. A memory system according to claim 1, wherein the accessing means include:

a data register (39) having a capacity of at least $pq$ image points;

routing circuitry (47, 49, FIGS. 7–9) and routing control circuitry (7, 15) for causing each image point $I(i,j)$ to be routed between the data register and the $M(i,j)$th memory modules; and address calculation circuitry (7, 9, 11, 13, FIGS. 3–6) coacting with the routing circuitry and the routing control circuitry for causing each image point $I(i,j)$ to be retrieved from or written into cell location $A(i,j)$ of the $M(i,j)$th module.

3. A word organized random across memory system modified for image processing operations so that the pq image points of any $1 \times pq$ or $p \times q$ subarray of any $rp \times sq$ image array of points storable in the memory can be retrieved from or written into the system in a single memory cycle; each image point $I(i,j)$ assuming a Boolean value when $i$ and $j$ lie in the respective ranges $0 \leq <rp=1$ and $0 \leq j<sq-1$, the system comprising:

memory means (21, 23, 25) for storing rpsq image points in the cells of $pq$ different memory modules, each memory module being an entity capable of storing rs image points in distinguishable cells, only one cell of each module being accessible at any single instant of time;

a register (39) for holding at least pq image points;

routing circuitry (15, 47, 49, FIGS. 7–9) for causing the appropriate subarray points to be routed between the $k$th memory module and the $g(i,j,k)$th register location, where $k$ lies on the range $0 \leq k<pq$ and where the function $g(i,j,k)$ is defined by the relation:

$g(i,j,k)=(k-iq-j)//pq$ wherein $(k-iq-j)//pq$ constitutes the non-negative remainder resulting from the integer division of $(k-iq-j)$ by pq; and addressing circuitry coacting with the routing circuitry and responsive to designation of subarray shape $t$ and of the subarray starting point $I(i,j)$ for determining the appropriate cell location $l(i,j,k,t)$ within the kth module according to the relation:

$l(i,j,k,t)=\bar{t}[(i/p)s+(j+g(i,j,k))/q]+t[-](i,j,k)/q)/p]s+(j+g(i,j,k)//q)//q)/q]$, where the operators "/" and "//" designate resectively, an integer quotient and an integer remainder.

4. A system according to claim 3, wherein the routing circuitry includes:

a first permuter (47, FIG. 7) interposed between the register and the memory modules for rotating the $pq$ subarray image points extracted from the register to the right by the number of positions equal to the magnitude of $M(i,j)=(iq+j)//pq$; and a second permuter (49, FIG. 9) interposed between the memory modules and the data register for rotating the sequence of subarray image points extracted from the memory modules to the left by the number of positions equal to the magnitude of $M(i,j)$.

5. A word-organizer random access memory system modified for image processing operations so that pq image points of any $1 \times pq$ or $p \times q$ subarray of any $rp \times sq$ image array of points storage in the memory can be retrieved from or written into the system in a single memory cycle; each image point $I(i,j)$ assuming a Boolean value when $i$ and $j$ lie in the respective ranges $0 \leq i<rp-1$ and $0 \leq j<sq-1$, the system comprising:

memory means (21, 23, 25) for storing rpsq image points in the cells of $pq$ different memory modules, each module being an entity capable of storing rs image points in distinguishable cells, only one cell of each module being accesible at any single instant of time;

routing circuitry (15, 47, 49, FIGS. 9–7) for causing each image point $I(i,j)$, the memory module being designated by the relation $M(i,j)=(iq+j)//pq$, where $(iq+j)//pq$ is the remainder resulting from the enteger division of $(iq+j)\times pq$; and addressing circuitry (7, FIGS. 3–6) coacting with the routing circuitry for causing each image point $I(i,j)$ to be retrieved from or written into a corresponding cell location $A(i,j)$ of module $M(i,j)$ according to the relation $A(i,j)=(i/t)s+j/q$, where $i/p$ and $j/p$ represent integer quotients.

* * * * *

UNITED STATES PATENT OFFICE
CERTIFICATE OF CORRECTION

Patent No. 3,938,102 Dated February 10, 1976

Inventor(s) Thomas Harvey Morrin and David Curtis Van Voorhis

It is certified that error appears in the above-identified patent and that said Letters Patent are hereby corrected as shown below:

Column 1, line 9, after "access" insert --method--;
1, line 11, change "work" to --word--;
1, line 13, change "work" to --word--;
Column 12, line 67, change "menory" to --memory--'
13, line 19, change "0≤ <rp=1" to --0 ≤ i < rp-1--;
13, lines 40 and 41, delete the equation as printed and insert therefor -- $l(i,j,k,t)=\bar{t}[(i/p)s+(j+g(i,j,k))/q]+t[[(i+g(i,j,k)/q)/p]s+(j+g(i,j,k)//q)/q]$ --

Column 14, line 16, change "word-organizer" to --word-organized--
14, line 28, change "accesible" to --accessible--.

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,938,102 Dated February 10, 1976

Inventor(s) Thomas Harvey Morrin and David Curtis Van Voorhis

It is certified that error appears in the above-identified patent and that said Letters Patent are hereby corrected as shown below:

Column 14, line 29, after "of time" insert --a register (39) for holding at least pq image points-- line 31, after "image point I(i,j)" insert --to be routed between the register and preselected memory modules-- line 39, change "(i/t)" to --(i/p)--.

Column 14, lines 33 and 34, change "enteger" to -- integer --;

Column 14, line 39, change "j/p" to -- i/q --.

Signed and Sealed this

Seventh Day of September 1976

[SEAL]

*Attest:*

RUTH C. MASON
*Attesting Officer*

C. MARSHALL DANN
*Commissioner of Patents and Trademarks*